Jan. 17, 1950 C. E. ERICKSON 2,495,164

HOUSING LATCH FOR TELEPHONE SETS

Filed May 19, 1945 4 Sheets-Sheet 1

Inventor:
Clifford E. Erickson
By C. A. Soper
Atty.

Inventor:
Clifford E. Erickson
By C. P. Soper
Atty.

Inventor:
Clifford E. Erickson
By C. L. Soper
Atty.

Jan. 17, 1950 C. E. ERICKSON 2,495,164

HOUSING LATCH FOR TELEPHONE SETS

Filed May 19, 1945 4 Sheets-Sheet 4

Inventor:
Clifford E. Erickson
By C. P. Soper
Atty.

Patented Jan. 17, 1950

2,495,164

UNITED STATES PATENT OFFICE 2,495,164

HOUSING LATCH FOR TELEPHONE SETS

Clifford E. Erickson, Chicago, Ill., assignor to Kellogg Switchboard and Supply Company, Chicago, Ill., a corporation of Illinois Application May 19, 1945, Serial No. 594,619

1 Claim. (Cl. 179—100)

This invention relates to telephone sets such as are installed at subscriber stations. Its general object is to provide an improved constructional arrangement permitting use of the same basic assemblage for a desk set and for a wall set.

The invention is illustrated as applied to an arrangement wherein the principal instrumentalities required (excluding the handset) are mounted and interconnected on a base plate having terminals mounted thereon to which the conductors of the telephone line and those in the cord of the hand telephone may be attached. This base plate is provided with feet and supplied with a suitable desk-set housing to form a desk set, and it is used without feet and supplied with a wall-set housing to form a wall set.

In the illustrated embodiment, the instrumentalities mounted on the base plate include the ringer, a condenser block, an induction-coil block, and a hookswitch. The hookswitch is arranged to be controlled by a hookswitch plunger carried as a part of the base assembly, and arranged to cause the hookswitch to move between its normal and talking positions responsive to longitudinal movement of the hookswitch plunger along a line perpendicular to the base plate.

A feature of the invention is that each of the housings carries apparatus for controlling the hookswitch plunger by force applied longitudinally thereof, by the weight of the handset. Each housing carries a vertically reciprocable handset plunger for this purpose. In the desk-set housing the handset plunger acts on the hookswitch plunger, while, in the wall-set housing the handset plunger acts through a bell-crank translating device, carried by the housing, which translates the vertical motion of the handset plunger into horizontal motion of the hookswitch plunger.

A related feature is that the same plunger assembly, including a guide bracket for the plunger, can be mounted in the wall-set housing and in the desk-set housing, and that the guide bracket has one set of openings through which it is attached to the desk-set housing and another set of openings through which it is attached to the wall-set housing.

A further feature is that each housing is adapted to be secured to the base plate by a simple arrangement including a retaining catch at the rear which is alike for both housings, and including specifically different retaining means at the front for each housing, both of which cooperate with the same base-plate portion. The desk-set housing is conveniently secured to the base plate at the front by a screw passing into the housing through an opening in a slightly raised portion of the base plate, which arrangement, however, cannot be used for the wall set because of interference by the wall or other vertical surface on which the set is mounted. The wall-set housing is accordingly provided with a snap latch which conveniently engages the same raised portion of the base plate, bridging the above-mentioned opening therein.

A further object of the invention is to provide an improved arrangement of the desk-set housing which facilitates lifting of the desk set for moving. A related feature is that the desk-set housing is formed to provide a recess for the hand between ridges leading up to the rear tines of the handset cradle, across which recess is provided a grip bar formed integrally with the remainder of the housing and supported between the said rear ridges.

A feature of both housings is that the cradle is placed relatively near the end remote from the calling-device opening, thereby providing an intermediate space of increased height for accommodating one or more pieces of accessory equipment which may be required to be included in the base assembly of some sets.

Other objects and features, more or less incidental to the foregoing, will appear as the description progresses.

The accompanying drawings, comprising Figs. 1 to 6, 6A, 7, and 8, show sufficient views of a desk set and a wall set embodying the features of the invention to enable the invention to be understood.

*The base assembly*

Figures 5, 6, 6A:
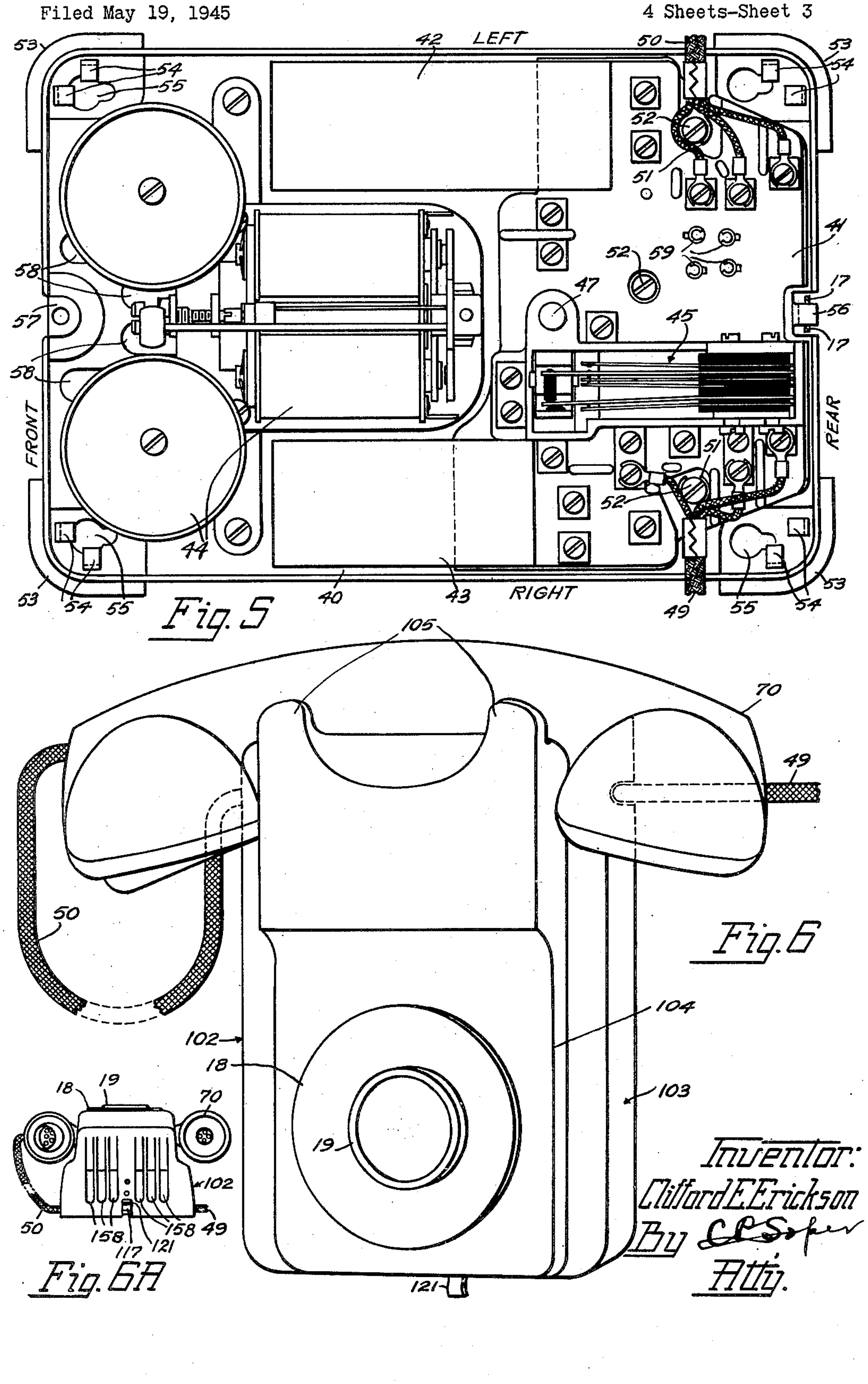
Fig. 5 is a plan view of the base assembly, shown equipped with feet for use in the desk set.
Fig. 6 is a front view of the wall set showing the handset in its normal position.
Fig. 6A is a reduced-scale bottom view of the wall set, showing the location of the outlet openings for the sound given off by the ringer.

Referring particularly to Fig. 5, the base assembly shown in plan view therein, being common to the desk set and wall set, will be considered first.

The base assembly (shown separately in plan view in Fig. 5) includes base plate 40, of a generally oblong configuration, having its marginal portion upturned to give it rigidity. In Figs. 1 to 5, the base plate is shown as supplied at the corners with feet 53 for use in the desk set. These feet are attached to the base plate by tabs 54 (Fig. 5) which are first passed through slots in the base plate and are then bent over.

As shown in Fig. 5, the marginal upturned stiffening edge of base plate 40 is cut away at the center of the rear portion, and marginal slots are cut into the principal portion of the base plate to leave a tongue 56, which is utilized in both the desk set and the wall set as one point of attachment between the base plate and the housing.

Additionally, the marginal upturned stiffening edge is cut away at the front of base plate 40 to provide a gap within which a small section of the principal portion of the base plate is raised at 57, to about the height of the upturned marginal portion, to provide a ready means for securing the front portion of the base plate to either the desk-set housing or the wall-set housing.

Base block 41 is attached to the rear portion of base plate 40 by three screws 52, two of which also hold the fasteners 51 of line cord 49 and handset cord 50. This dual use of these two screws 52 is made possible by locating them within the illustrated recesses in base block 41 for entry of the cords 49 and 50, through marginal slots in the housing.

Base block 41 is provided with screw terminals as illustrated for the conductors in cords 49 and 50, and is provided with other terminals for conductors (not shown) for attaching the ringer terminals to the desired points in the subset circuit. Additionally, base block 41 is provided with pin-socket terminals (not shown) for receiving pin terminals of the induction coil block 43 and condenser block 42. The blocks 42 and 43 are conveniently held in their respective mounting locations by the cooperation of their pin terminals with the above-mentioned pin socket terminals in base block 41. A set of four pin sockets 59 is provided in base block 41 to receive the four pins of a plug (not shown) which may terminate a cord attached to the usual dial-type calling device when mounted in the housing.

Figure 4:
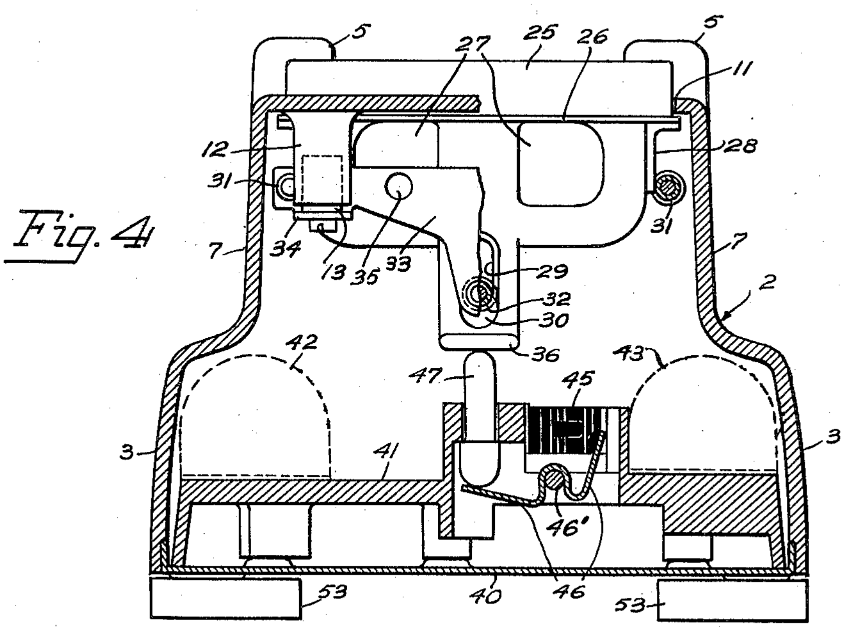
Fig. 4 is a sectional view looking to the rear generally along the line 4—4 of Fig. 2.

Base block 41 is formed to receive hookswitch assembly 45, which in practice comprises contact springs of the usual leaf construction, each such leaf being provided with a side tab extending downwardly into the hollow space indicated in Fig. 4 as provided between base plate 40 and the lateral defining wall of base block 41. Conductors (not shown) interconnecting the several screw terminals, pin-socket terminals, and leaf-spring terminals of base block 41, lie within the hollow back portion of base block 41.

It will be noted that ringer 44 is mounted on base plate 40 so that its actuating mechanism (including its magnet windings) lies generally between condenser block 42 and induction-coil block 43, while its gongs lie to the front of such blocks. Suitable sound-outlet openings 58 are provided in base plate 40 below the ringer gongs.

These openings allow the sound of the ringer to emerge through the space between the feet 53 in the desk set.

The mechanism directly controlling hookswitch assembly 45 is shown best in Fig. 4. It includes plunger 47, mounted for sliding movement in an opening through a raised portion of the top wall of base block 41. It is located to the left of the free end of the leaf springs in assembly 45. The concerned parts are shown in their off-normal, or talking, position in Figs. 4 and 5. A lever 46, pivoted at 46′, generally of the usual bell-crank configuration, is provided to translate the movement of plunger 47 into a movement of the free end of the leaf springs perpendicular to the movement of the plunger. In practice, the pivot pin 46′ for lever 46 is dropped into convenient slots in base block 41 before lever 46 and hookswitch assembly 45 are placed in their assembled position.

When plunger 47, as seen in Fig. 4, is moved vertically downward, as by a downward movement of plunger 25 carried in the desk-set housing, bell-crank lever 46 rotates about its pivot to move the free end of spring assembly 45 to the left, thereby placing the hookswitch combination in its normal position.

*The desk set*

The desk set of Figs. 1 to 4 comprises housing 2 secured in place over the base assembly shown in plan view in Fig. 5. The central portion of the rear wall of housing 2 is provided with internal pillar 16 (Fig. 2) containing an insert member 17 which has an opening therethrough to receive the tongue 56, formed integrally with base plate 40 as previously described. The central front portion of housing 2 is provided with internal pillar 14 containing an insert member 15 which is threaded to receive a fastening screw extending through the illustrated screw opening in the front raised portion 57 of base plate 40.

Figures 1, 2:
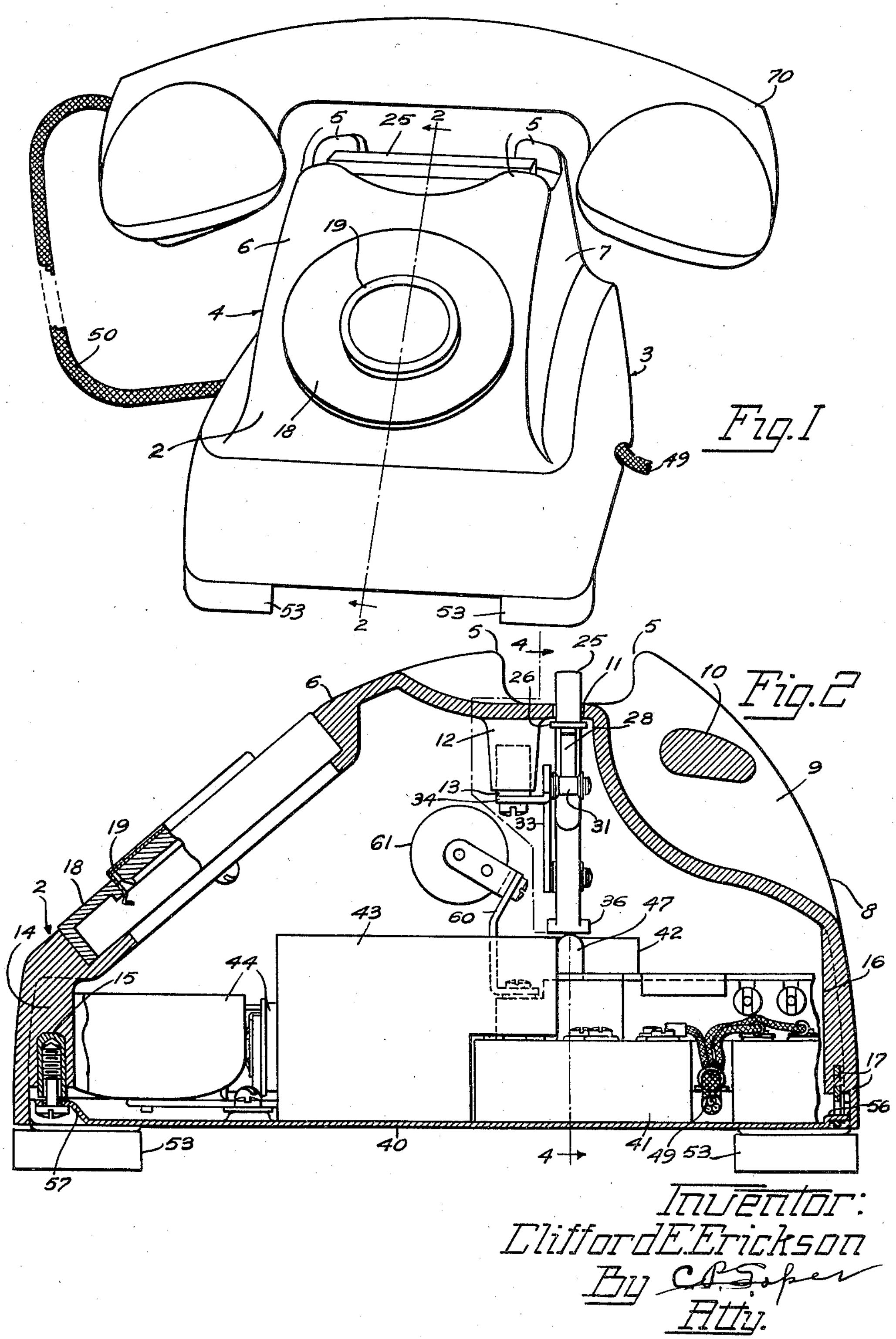
Fig. 1 shows a perspective view of the desk set, as seen from the front, with the handset raised slightly from its normal position on the cradle.
Fig. 2 is a side sectional view taken generally along the line 2—2 of Fig. 1.
Figure 3:
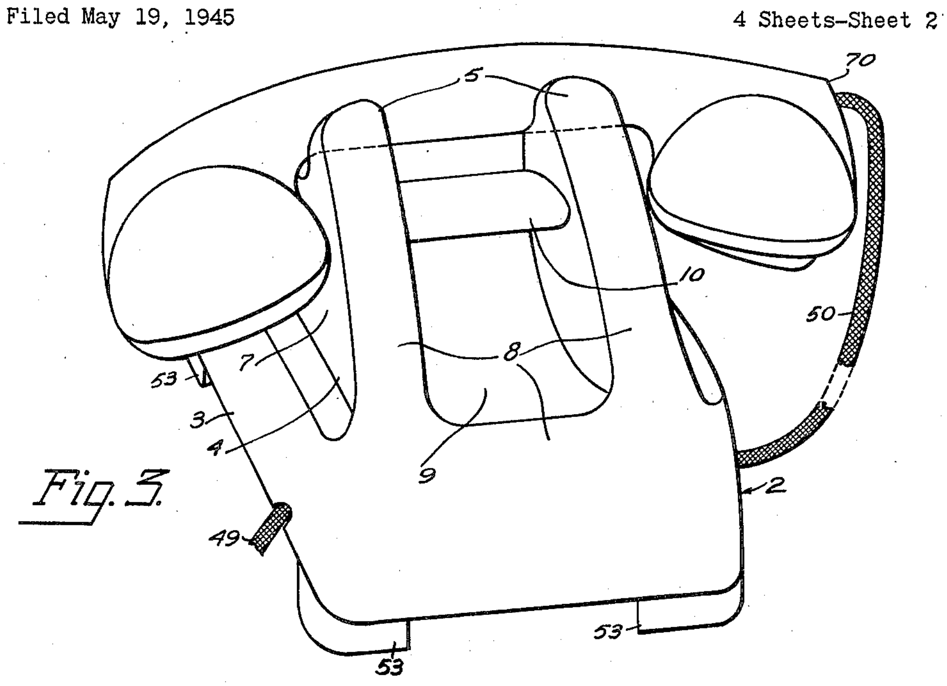
Fig. 3 is a rear view of the desk set with the handset in its normal position.

The desk-set housing, referred to generally by the reference character 2, has an external appearance as shown in Figs. 1 and 3, and is formed (as by molding or die casting) with a hollow interior having a configuration as shown in Figs. 2 and 4.

Housing 2 comprises a comparatively wide base section 3, surmounted by a pedestal portion 4. The side walls 7 of pedestal portion 4 are generally vertical, as shown best in Fig. 4. The front wall 6 slopes upwardly and rearwardly, and the rear wall 8 curves upwardly and forwardly, toward a cradle for handset 70. This cradle extends transversely of the housing, and is defined laterally by four tines 5. The bed of the cradle is pierced by a vertical slot 11 to accommodate plunger 25, through which the hookswitch carried in the base assembly is controlled by the weight of handset 70.

The sloping front wall 6 has an opening therein (seen in sectional view in Fig. 2) to accommodate the usual dial type of calling device when the subset is used as an automatic telephone set. This opening is shown filled with a cover blank 18, which carries a concentrically located card holder 19, detachably secured thereto. Thus, the set is illustrated as a manual telephone set, but may be readily made into an automatic telephone set by replacing blank 18 by a calling device having a cord attached thereto terminating in a plug suitable for insertion into the pin-socket terminals 59 of Fig. 5.

As shown in Figs. 2 and 3, the rear wall 8 is depressed at section 9 to form a fingers-receiving recess between the ridges leading upward to the rear tines 5. The grip bar 10 acts as a bridge between the ridges, and lies within the recess 9. It enables the desk set to be readily lifted and moved. The illustrated configuration of the concerned parts enables the grip bar 10 to be molded integrally in one operation with the remainder of the desk-set housing, using a minimum of lateral inserts during the molding operation. Alternatively, grip bar 10 can be made separately and be cemented or otherwise secured in place, as within a suitable groove in the ridges in which it ends.

The upper portion of the rear recessed section 9 gives the fingers free access to grip the handle of handset 70 when the handset is to be lifted from its normal position (see Fig. 3) within the cradle.

As shown by Figs. 1 and 2, there is a shallow recess between the front tines 5, to allow free access to the front side of the handle of the handset when the handset is to be removed from its cradle.'

*Desk-set plunger system*

Referring particularly to Figs. 2 and 4, the arrangement in the desk-set housing for actuating the hookswitch system contained in the base assembly will now be described Briefly, plunger 25 ends in a foot portion 36 which rests on the upper end of plunger 47, carried by the base assembly. Depressing plunger 25 causes plunger 47 to move down to actuate the hookswitch assembly 45 (Figs. 4 and 5).

The top portion of plunger 25 is arranged to extend almost entirely across the cradle of the housing, so as to insure actuation of the hookswitch under practically all positions of the handset in the cradle, even though one end or the other of the handset should be kept from descending completely into the cradle, as when a portion of cord 50 is between the tines 5.

Laterally widened rim portion 26 limits the upward movement of the plunger 25 in case it should be grasped in an attempt to withdraw it from the housing. Preferably, rim portion 26 is located slightly below the inside surface of the top wall of the housing, whereby the rim portion does not come into play normally. This arrangement permits control plunger 47 in the base assembly (see Fig. 4) to be actuated upwardly to its illustrated limit position, thereby insuring complete movement of the hookswitch assembly from normal position to alternate position.

The up and down movement of plunger 25 is guided by three double-flanged rollers, comprising two side rollers 31 and a lower roller 32. The plunger is provided with a pair of trackway portions 28 of reduced thickness to fit between the flanges of side rollers 31, and the lower portion of the plunger is provided with a similar, but double-sided, trackway 29 which operates between flanged ends of lower roller 32. The lower end portion 30 of this slot is made large enough to receive the lower roller 32 during assembly of the parts. The rollers are preferably arranged with sufficient closeness of fit that they prevent any contact between plunger 25 and the ends of slot 11 of the casing to prevent wear and to reduce friction, particularly when the handset is placed in position with one end lowered, giving an unbalanced downward thrust to one corner of the plunger. The construction being described is particularly useful when the housing and the plunger 25 are molded of a plastic material having a relatively high coefficient of friction and being subject to wear when one such surface slides over the other.

The three guide rollers 31 and 32 are conveniently mounted on bracket 33, shown with the right half portion broken away in Fig. 4 to afford a clearer view of the concerned portion of plunger 25. The main portion of bracket 33 lies parallel to plunger 25. It has a pair of horizontal mounting tabs 34 through which it is secured to the desk-set housing by a pair of screws which enter tapped inserts 13 incorporated in posts 12, depending from the top wall of the housing. The opening 35 (Fig. 4) through the main portion of bracket 33 is one of a pair of similar openings provided in the bracket to enable it to be mounted in the wall-set housing. It may be noted further that the openings 27 in plunger 25 have no particular utility in the desk-set housing, but are used as clearance openings when the plunger is installed in the wall-set housing, as will be subsequently described.

The apparatus shown in Fig. 5 as comprising a part of the base assembly includes all the apparatus ordinarily (or universally) required to be included in such assembly. Occasionally, however, one or more other units of apparatus may be required to be made a part of the base assembly. These auxiliary units of apparatus may include a telephone-type relay (including an electromagnet, an armature, and contacts controlled thereby), an impedance coil to be included in the telephone circuit, and a space discharge device, usually of the cold-cathode type such as may be included in circuit with the ringer for well-known apparatus. In view of the foregoing, the cradle portion of the desk-set housing has been located comparatively far to the rear so as to leave a rather roomy space within the housing between the calling-device opening and the plunger mechanism, and above the level of the apparatus normally included in the base assembly. Fig. 2 indicates how one piece of auxiliary apparatus is mounted within a portion of this space. This auxiliary piece of apparatus is the electron discharge device 61, seen in end view and mounted on auxiliary bracket 60. Bracket 60 is illustrated in the position it would occupy if attached to base block 41 (Fig. 5) by the two screws situated just forward of the end of hookswitch assembly 45. Parts 60 and 61 are omitted from Fig. 5 to permit a better view of the parts which would be obscured thereby.

*The wall set*

The wall set of Figs. 6, 6A, 7, and 8 comprises housing 102, secured in place over the base assembly shown in plan view in Fig. 5, but with feet 53 omitted, thereby exposing openings 55 through which base plate 40 may be secured to the wall.

Figure 8:
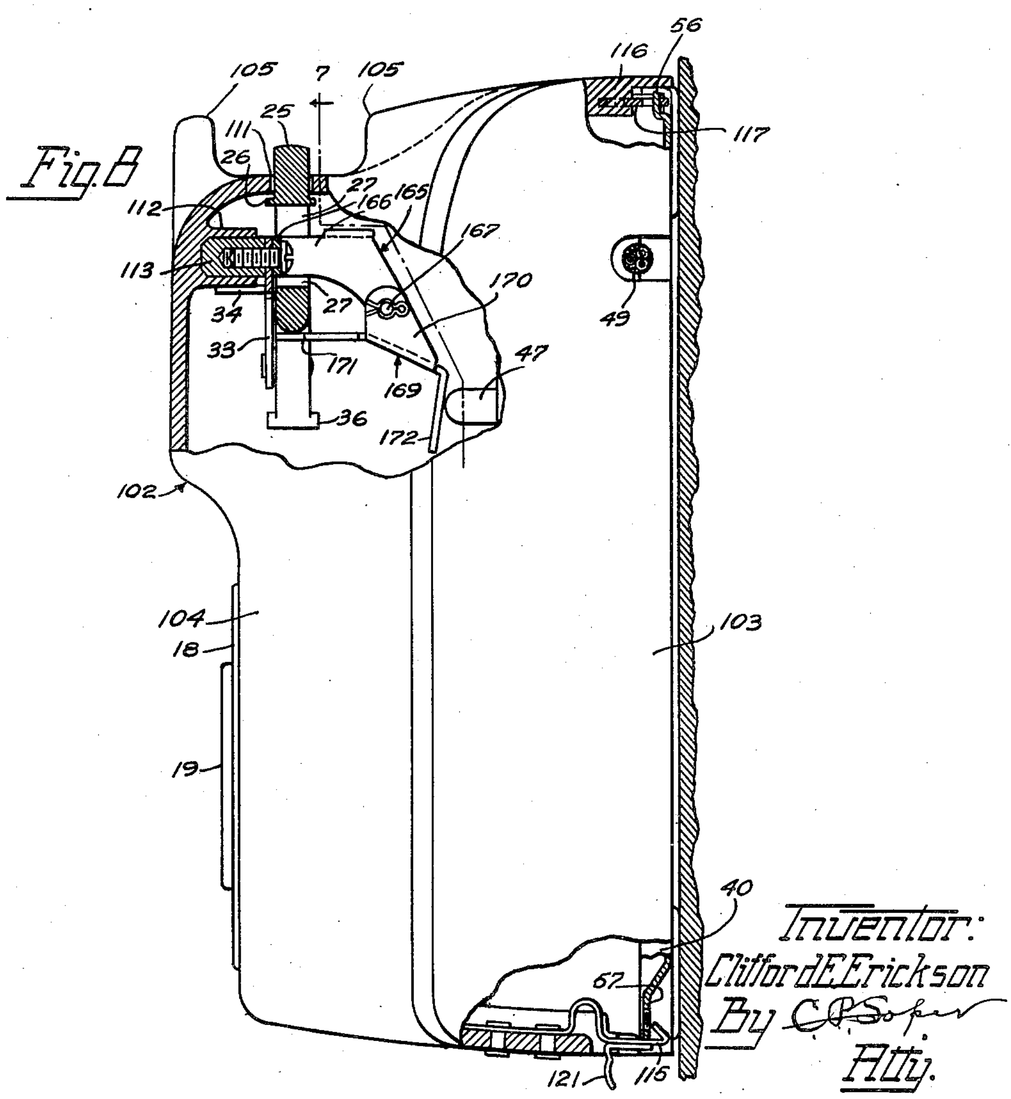
Fig. 8 is a right-side view of the wall set with certain parts broken away.

Desk-set housing 102 has an external appearance as shown in Figs. 6 and 8. It comprises a comparatively wide base section 103, followed by pedestal 104 of reduced width. Pedestal 104 has an aperture in the front wall 106 thereof for receiving a calling device when an automatic telephone is desired. This aperture is shown closed by circular blank 18 (the same one used in the desk set), wherefore the wall set is shown as a manual telephone set).

The upper part of pedestal 104 is brought out further from the wall than the lower part and ends in a cradle for handset 70, surrounded by four tines 105.

The upper end of housing 102 is provided with an internal pillar 116 including an insert member 117 (similar to the member 17 of the desk-set housing) which is slotted to receive tongue 56 (Fig. 5) of the base plate to hold the housing and base plate together at the top. The bottom portion of the wall-set housing is provided with a spring catch 115, which may be secured by the illustrated rivets passing through the lower wall of the housing. After the base assembly has been secured to the wall (as by screws passing into the wall through openings 55, Fig. 5), the housing may be installed by first bringing the top portion thereof into contact with the base from above so as to engage insert member 117 over tongue 56, and by then bringing the lower part of the housing into position. As the final position is approached, the sloping hooked end portion of spring catch 115 engages the lower edge of raised portion 57 (see Figs. 5 and 8), permitting the hook on part 115 to pass behind part 57, whereupon the hook springs into the position shown in Fig. 8 to retain the housing securely in place. The downwardly extending member 121 may be fixed with spring catch 115 to enable the spring catch to be readily disengaged when the housing is to be removed.

*Wall-set plunger system*

Figure 7:
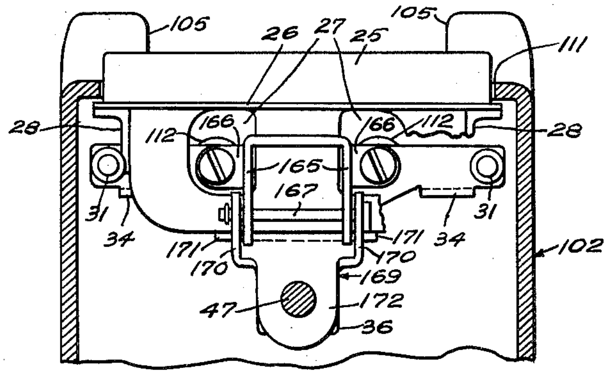
Fig. 7 is a fragmentary sectional view looking toward the front generally along line 7—7 of Fig. 8.

As shown in Figs. 7 and 8, plunger 25 is mounted for up and down movement generally as shown for the desk set. That is, the portion of plunger 25 above peripheral stop rim 26 operates through the oblong opening 111 in housing 102, the plunger being guided at points below stop rim 26 by the flanged rollers mounted on guide bracket 33, transferred to the wall set from the desk set.

The mounting tabs 34 used in the desk set are not used in the wall set, where bracket 33 is retained in mounted position by screws passing through the pair of openings 35, one of which is shown in Fig. 4. These mounting screws enter tapped inserts 113 in posts 112 attached to the inside of the front wall of the wall-set housing.

Hookswitch plunger 47, included in the base assembly, is horizontally disposed in the wall set, whereby its movement is at right angles to the necessarily vertical movement of plunger 25 in the wall set. Accordingly, translating lever 169 is provided in the wall set to translate the vertical movement of plunger 25 therein into the required horizontal movement of plunger 47. Lever 169 is pivotally secured, by upturned ears 170, to pivot pin 167 supported in the U-shaped support bracket 165. Bracket 165 has a pair of outturned ears 166 at its forward end, through which it is secured in mounted position by the same screws which hold guide bracket 33 in place. It will be noted that the forwardly extending arms of support bracket 165 lie within openings 27 in plunger 25, which openings also permit the mounting screws for brackets 33 and 165 to be installed or removed as desired. This is the arrangement previously referred to which utilizes openings 27.

Lever 169 has a forwardly extending portion which underlies plunger 25 on either side of the central portion which ends at 36, extension 171 being bifurcate for this purpose. Additionally, lever 169 has a downwardly extending portion which contacts the end of hookswitch plunger 47 of the base assembly.

Referring particularly to Fig. 8, when the plunger 25 is depressed, as when the handset 70 is placed in the cradle, lever 169 is rotated by pivot pin 167, responsive to the downward movement of bifurcate arm 171, whereupon downwardly extending arm 172 executes a generally horizontal movement, forcing hookswitch plunger 47 inwardly (toward the wall) against the tension of hookswitch assembly 45 (Figs. 4 and 5). Hookswitch 45 is thus brought from its talking position to its normal position. When the plunger 25 is again permitted to rise, as when the handset is removed from the cradle, the stored spring tension in the hookswitch assembly causes a reversal of the described movements.

Referring now particularly to Fig. 6A, which shows the wall set as seen from below, it will be noted that housing 102 is provided with sound outlet apertures 158 to permit emergence of sound generated by the ringer. These slots are provided because the wall against which the base is mounted (keeping in mind that feet 53, Figs. 1 to 5, are removed) blocks sound outlet openings 58, Fig. 5, in base 40.

I claim:

In combination, a base assembly adapted alternatively to lie at rest on a suitable surface and to be secured fixedly in place against a surface, said assembly including a base plate having telephone-substation instrumentalities mounted thereon, a desk-type housing arranged to be secured to the base assembly to enclose said instrumentalities when the base assembly is to lie at rest on a surface, a wall-type housing arranged to be secured to the base assembly to enclose said instrumentalities when the base assembly is to be secured fixedly in place against a surface, one margin of the base assembly including a first portion formed to serve as one member of a first latch adapted to be engaged and disengaged by relative movement of the members thereof along a path extending laterally toward and away from the base assembly, the opposed margin of the base assembly including a second portion adapted to serve alternatively as one member of a second latch generally similar to the first and as a clamp-engaged member, each housing including a member adapted to cooperate with said first portion to complete said first latch when the housing is assembled with the base, the wall-type housing carrying a flexibly supported member adapted to cooperate with said second portion to complete the second latch, while the desk-type housing carries a portion serving as one anchor point for a clamp member which anchors against said second portion to secure the housing to the base assembly.

CLIFFORD E. ERICKSON.

REFERENCES CITED

The following references are of record in the file of this patent:

UNITED STATES PATENTS

| Number | Name | Date |
|---|---|---|
| 1,590,355 | Erickson | June 29, 1926 |
| 1,734,124 | Green et al. | Nov. 5, 1929 |
| 1,762,641 | Schneider et al. | June 10, 1930 |
| 2,008,287 | Lum | July 16, 1935 |
| 2,076,244 | McLarn | Apr. 6, 1937 |
| 2,096,046 | Kuhn et al. | Oct. 19, 1937 |
| 2,215,860 | Sengebusch | Sept. 24, 1940 |
| 2,226,734 | McLarn | Dec. 31, 1940 |
| 2,244,918 | Obergfell | June 10, 1941 |
| 2,279,713 | McLarn | Apr. 14, 1942 |
| 2,333,299 | Deakin | Nov. 2, 1943 |
| 2,361,880 | Shann | Oct. 31, 1944 |
| 2,365,481 | McLarn | Dec. 19, 1944 |